US012753549B2

(12) United States Patent
Takemoto et al.

(10) Patent No.: US 12,753,549 B2
(45) Date of Patent: Oct. 6, 2026

(54) SIMULTANEOUSLY DYEING AND FLAME-RETARDANT FINISHING METHOD FOR POLYESTER BASED TEXTILE

(71) Applicant: DAIKYO CHEMICAL CO., LTD., Kyoto (JP)

(72) Inventors: Aiko Takemoto, Kyoto (JP); Terufumi Iwaki, Kyoto (JP)

(73) Assignee: DAIKYO CHEMICAL CO., LTD., Kyoto (JP)

( * ) Notice: Subject to any disclaimer, the term of this patent is extended or adjusted under 35 U.S.C. 154(b) by 996 days.

(21) Appl. No.: 17/799,093

(22) PCT Filed: Sep. 28, 2020

(86) PCT No.: PCT/JP2020/036672

§ 371 (c)(1),
(2) Date: Aug. 11, 2022

(87) PCT Pub. No.: WO2021/161577

PCT Pub. Date: Aug. 19, 2021

(65) Prior Publication Data

US 2023/0101712 A1 Mar. 30, 2023

(30) Foreign Application Priority Data

Feb. 14, 2020 (JP) ................................ 2020-023014

(51) Int. Cl.

| | |
|---|---|
| ***C09B 1/56*** | (2006.01) |
| ***C09B 5/10*** | (2006.01) |
| ***C09B 51/00*** | (2006.01) |
| ***C09B 57/12*** | (2006.01) |
| ***C09B 67/22*** | (2006.01) |
| ***D06M 13/44*** | (2006.01) |
| ***D06P 1/00*** | (2006.01) |
| ***D06P 1/20*** | (2006.01) |
| ***D06P 3/54*** | (2006.01) |
| *D06M 101/32* | (2006.01) |

(52) U.S. Cl.

CPC .............. *D06P 1/0036* (2013.01); *C09B 1/56* (2013.01); *C09B 5/10* (2013.01); *C09B 51/00* (2013.01); *C09B 57/12* (2013.01); *C09B 67/0033* (2013.01); *D06M 13/44* (2013.01); *D06P 1/20* (2013.01); *D06M 2101/32* (2013.01); *D06M 2200/30* (2013.01); *D06P 3/54* (2013.01)

(58) Field of Classification Search

CPC . D06P 1/0036; D06P 1/20; D06P 3/54; C09B 1/56; C09B 5/10; C09B 51/00; C09B 57/12; C09B 67/0033; D06M 13/44; D06M 2101/32; D06M 2200/30

USPC .............................................................. 8/495

See application file for complete search history.

(56) References Cited

U.S. PATENT DOCUMENTS

| | | | | |
|---|---|---|---|---|
| 4,197,087 A * | 4/1980 | Ami | D06P 1/525 | 524/561 |
| 5,591,850 A * | 1/1997 | Birbaum | D06P 1/6426 | 544/216 |
| 2004/0249029 A1* | 12/2004 | Iwaki | D06M 13/453 | 524/121 |

FOREIGN PATENT DOCUMENTS

| | | | | |
|---|---|---|---|---|
| CN | 102127315 A | * | 7/2011 | |
| JP | 2001-342375 | | 12/2001 | |
| JP | 2004-168950 | | 6/2004 | |
| JP | 2005-2256 | | 1/2005 | |
| JP | 2006-57065 | | 3/2006 | |
| JP | 2007-51385 | | 3/2007 | |
| JP | 2009-270213 | | 11/2009 | |
| JP | 2012102444 | * | 5/2012 | C09K 21/12 |
| WO | 03/035965 | | 5/2003 | |
| WO | 2012/067027 | | 5/2012 | |

OTHER PUBLICATIONS

International Search Report (ISR) issued Nov. 17, 2020 in International (PCT) Application No. PCT/JP2020/036672.

* cited by examiner

*Primary Examiner* — Amina S Khan
(74) *Attorney, Agent, or Firm* — Wenderoth, Lind & Ponack, L.L.P.

(57) ABSTRACT

Provided by the present invention is a method for simultaneously dyeing and flame-retardant finishing a polyester-based fiber product, which is excellent regarding dyeing reproducibility, the method including immersing and heating a polyester-based fiber product in a processing bath containing a specific yellow disperse dye and a phosphoramidate represented by Formula (V):

[Chem. 1]

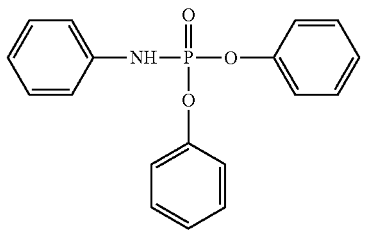

(V)

2 Claims, No Drawings

SIMULTANEOUSLY DYEING AND FLAME-RETARDANT FINISHING METHOD FOR POLYESTER BASED TEXTILE

TECHNICAL FIELD

The present invention relates to a method for simultaneously dyeing and flame-retardant finishing a polyester-based fiber product, and more specifically relates to a method for simultaneously dyeing and flame-retardant finishing a polyester-based fiber product wherein a polyester-based fiber product is immersed in a processing bath that contains a specific yellow disperse dye and a specific flame retardant and is heated under an increased pressure so as to perform simultaneous dyeing and flame-retardant finishing of the polyester-based fiber product, whereby a dyed and flame-retardant-finished polyester-based fiber product can be obtained with excellent dyeing reproducibility. Further, the present invention relates to a dyed and flame-retardant-finished polyester-based fiber product obtained in this way.

BACKGROUND ART

Conventionally, as yellow disperse dyes that process hydrophobic fiber products such as polyester-based fiber products into dyed products having excellent light fastness, yellow disperse dyes represented by the following formulae are known:

Formula (I)

(I)

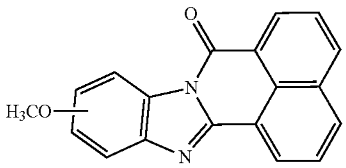

Formula (II)

(II)

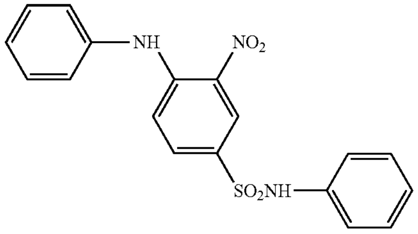

Formula (III)

(III)

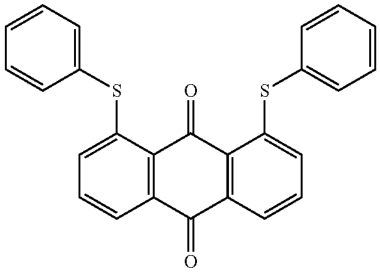

and

Formula (IV)

-continued (IV)

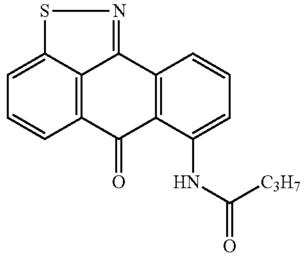

(See Patent Documents 1, 2, and 3).

When a polyester-based fiber product is to be dyed, it is conventionally common that disperse dyes of yellow, red, and blue colors are used as three principal colors and are mixed depending on a desired hue. In such a case, when dyeing properties of these yellow, red, and blue disperse dyes are uniform, particularly when dyeing rates thereof, that is, rates of increase of dyed amounts due to the temperature rise during dyeing are uniform, the hue of a dyed product obtained is hardly affected even if dyeing conditions, for example, the dyeing temperature fluctuates to some extent. In other words, the disperse dyes of three principal colors having uniform dyeing rates have excellent dyeing reproducibility when dyeing polyester-based fiber products.

In contrast, when dyeing rates of these disperse dyes of the three principal colors of yellow, red, and blue are not uniform, even a slight fluctuation of the dyeing conditions causes not only the hue of a dyed product obtained, but also the color yield varies significantly.

Thus, when a polyester-based fiber product is dyed with the disperse dyes, the disperse dyes of the three principal colors of yellow, red, and blue are required to have uniform dyeing rates. Then, it has been proposed to use a combination of dyes having specific structures, respectively, for the disperse dyes of the three principal colors of yellow, red, and blue, in order to dye a polyester-based fiber product with an excellent dyeing reproducibility (see Patent Documents 1 and 4).

Even in a case where a polyester-based fiber product is immersed and heated in a processing bath that contains a yellow disperse dye and a flame retardant so that the polyester-based fiber product is simultaneously dyed and finished with a flame retardant, which is similar to the above-described process of dyeing a polyester-based fiber product, the dyeing rate of the yellow disperse dye fluctuates even if the dyeing is performed under the same conditions, depending on the flame retardant used, as compared with a case where a polyester-based fiber product is dyed with a yellow disperse dye in the absence of a flame retardant. This causes the hue and the color consistency in the obtained dyed product to vary significantly. As a result, it is sometimes impossible to perform simultaneous dyeing and flame-retardant finishing of a polyester-based fiber product with excellent dyeing reproducibility.

Therefore, in order to obtain a flame-retardant-finished dyed product with excellent dyeing reproducibility by dyeing a polyester-based fiber product with a yellow disperse dye and finishing the same with a flame retardant simultaneously, it is necessary not only that the dye used should be excellent regarding dyeing reproducibility, but also that the flame retardant used should not inhibit the excellent dye reproducibility of the disperse dyes used in combination.

PRIOR ART DOCUMENT

Patent Document

Patent Document 1: WO2012/067027A1
Patent Document 2: JP-A-2006-57065
Patent Document 3: JP-A-2001-342375
Patent Document 4: JP-A-2004-168950

SUMMARY OF INVENTION

Problem to be Solved by the Invention

It is an object of the present invention to provide a method for simultaneously dyeing and flame-retardant finishing a polyester-based fiber product by which, in a case of simultaneous dyeing and flame-retardant finishing of a polyester-based fiber product in a processing bath that contains a yellow disperse dye and a flame retardant together, a dyed and flame-retardant-finished polyester-based fiber product is obtained with excellent dyeing reproducibility, by using at least one selected from yellow disperse dyes represented by Formulae (I) to (IV) above along with a specific flame retardant in combination.

It is also an object of the present invention to provide a a dyed and flame-retardant-finished polyester-based fiber product obtained by the above-described method for simultaneous dyeing and flame-retardant finishing.

Means to Solve the Problem

The present invention provides a method for simultaneously dyeing and flame-retardant finishing a polyester-based fiber product, the method including immersing a polyester-based fiber product in a processing bath containing:

(A) at least one yellow disperse dye selected from the group consisting of:

(1) a yellow disperse dye represented by Formula (I) below:

(I)

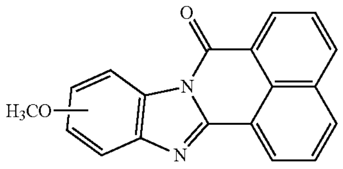

(2) a yellow disperse dye represented by Formula (II) below:

(II)

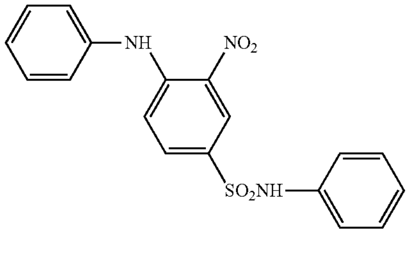

(3) a yellow disperse dye represented by Formula (III) below:

(III)

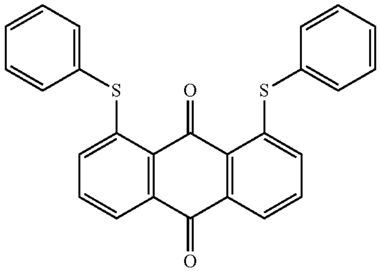

and (4) a yellow disperse dye represented by Formula (IV) below:

(IV)

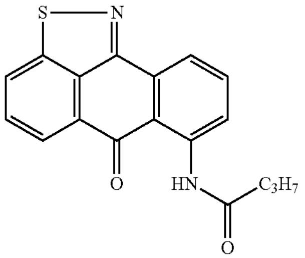

as well as (B) a phosphoramidate represented by Formula (V) below:

(V)

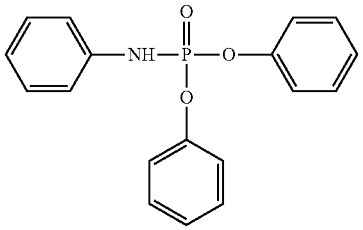

and the method further including heating the same.

In the above-described method of the present invention, more specifically, the polyester-based fiber product is immersed in the above-described processing bath, and is heated at 105° C. or higher under an increased pressure, and the processing bath preferably contains at least one of the disperse dyes represented by Formulae (I) to (IV) above in an amount in a range of 0.05 to 10% owf, and contains the phosphoramidate in an amount in a range of 0.5 to 10% owf.

In addition, according to the present invention, all of the at least one of the disperse dyes represented by Formulae (I) to (IV) above and the phosphoramidate preferably have an average particle size in a range of 0.2 to 2.0 μm.

According to the present invention, a dyed and flame-retardant-finished polyester-based fiber product is provided that contains the at least one of the yellow disperse dyes represented by Formulae (I) to (IV) above and the phosphoramidate represented by Formula (V) above.

Effect of the Invention

When a polyester-based fiber product is subjected to simultaneous dyeing and flame-retardant finishing in a processing bath containing a conventionally used flame retardant and the yellow disperse dye(s) represented by Formulae (I) to (IV), the dyeing rate of the yellow disperse dye fluctuates significantly, as compared with a case where it is dyed with the yellow disperse dye in the absence of the flame retardant. As a result, it is impossible to obtain a dyed and flame-retardant-finished polyester-based fiber product with excellent dyeing reproducibility.

However, when a polyester-based fiber product is subjected to simultaneous dyeing and flame-retardant finishing in a processing bath containing the flame retardant phosphoramidate represented by Formula (V) and the yellow disperse dye(s) represented by Formulae (I) to (IV) according to the present invention, the dyeing rate of the yellow disperse dye only slightly fluctuates, whereby a dyed and flame-retardant-finished polyester-based fiber product can be obtained with excellent dyeing reproducibility.

MODE FOR CARRYING OUT THE INVENTION

A method for simultaneously dyeing and flame-retardant finishing a polyester-based fiber product according to the present invention is a method of performing simultaneous dyeing and flame-retardant finishing by immersing and heating a polyester-based fiber product in a processing bath containing the yellow disperse dye(s) represented by Formulae (I) to (IV) and the phosphoramidate represented by Formula (V). By this method, it is possible to obtain a dyed and flame-retardant-finished polyester-based fiber product with excellent dyeing reproducibility.

In other words. In a method for simultaneously dyeing and flame-retardant finishing a polyester-based fiber product according to the present invention, the at least one of the yellow disperse dyes represented by Formulae (I) to (IV) above and the phosphoramidate represented by Formula (V) above are contained in the processing bath used in the method.

All of the yellow disperse dyes represented by Formulae (I) to (IV) above are already known, and commercially available ones can be used as any of the yellow disperse dyes in the method of the present invention.

The yellow disperse dye represented by Formula (I) above is C.I.Disperse Yellow 71, and the substitution position of a methoxy group at a phenyl group of a benzimidazole structure is not limited particularly.

The yellow disperse dye represented by Formula (II) above is C.I.Disperse Yellow 42, the yellow disperse dye represented by Formula (III) above is C.I.Solvent Yellow 163, and the yellow disperse dye represented by Formula (IV) above is C.I.Disperse Yellow 51.

In the present invention, when a polyester-based fiber product is subjected to simultaneous dyeing and flame-retardant finishing by using the yellow disperse dye(s) and the flame retardant phosphoramidate, it is preferable that the yellow disperse dye(s) and the flame retardant phosphoramidate have an average particle size of 0.2 to 2.0 μm so as to sufficiently diffuse and adhere in the inside of the polyester-based fiber product. The yellow disperse dye(s) and the flame retardant phosphoramidate, however, do not have to have the same average particle size.

The yellow disperse dyes and the phosphoramidate having average particle sizes in the above-described range can be obtained by, for example, preliminarily micronizing each of the yellow disperse dye and the phosphoramidate with a sand mill or a ball mill in water containing a surfactant.

A preferred surfactant used in the micronizing of the yellow disperse dyes is, for example, an anionic surfactant such as formalin condensate of naphthalenesulfonic acid and alkylbenzenesulfonic acid, formalin condensate of naphthalenesulfonic acid, formalin condensate of cresol and 2-naphthol-6-sulfonic acid, formalin condensate of alkylnaphthalenesulfonic acid, formalin condensate of creosote oil sulfonate, or lignin sulfonate; a nonionic surfactant such as a block copolymer of ethylene oxide and propylene oxide, ethylene oxide adduct of alkyl phenol, ethylene oxide adduct of polystyrenated phenol; or a mixture of any of these anionic surfactants and nonionic surfactants.

A preferred surfactant used in the micronizing of the phosphoramidate is, for example, an anionic surfactant such as sulfuric acid ester salt of arylated phenol ethylene oxide adduct, or sulfosuccinic acid ester salt of styrenated phenol ethylene oxide adduct; a nonionic surfactant such as a block copolymer of ethylene oxide and propylene oxide, ethylene oxide adduct of alkyl phenol, ethylene oxide adduct of polystyrenated phenol; or a mixture of any of these anionic surfactants and nonionic surfactants.

A method for simultaneously dyeing and flame-retardant finishing a polyester-based fiber product according to the present invention, as described above, includes: wet-pulverizing a specific yellow disperse dye and a specific flame retardant in the presence of the above-described surfactants, respectively, to make a dispersion of the yellow disperse dye and a dispersion of microparticles of the flame retardant; adding these dispersions into a bath containing water to prepare a processing bath having a predetermined bath ratio; immersing a polyester-based fiber product in this processing bath to subject the same to exhaustion processing in the bath for 30 to 60 minutes under an increased pressure at a temperature of 105° C. or higher, preferably at a temperature in a range of 105 to 140° C., or particularly preferably at a temperature in a range of 110 to 140° C.; and thereafter, removing the polyester-based fiber product thus processed, from the processing bath, soaping and washing the same with water, and then, dewatering and drying the same, whereby a dyed and flame-retardant-finished polyester-based fiber product can be obtained.

In other words, the present invention makes it possible to obtain a polyester-based fiber product that is dyed with the yellow disperse dye and is finished with the flame retardant can be obtained.

In the method for simultaneously dyeing and flame-retardant finishing a polyester-based fiber product according to the present invention, the used amounts of the yellow disperse dye and the flame retardant phosphoramidate are not limited particularly, but the yellow disperse dye is generally used in an amount in a range of 0.05 to 10% owf, preferably in a range of 0.1 to 10% owf, further preferably in a range of 0.2 to 8.0% owf, and particularly preferably in a range of 0.3 to 5.0% owf. Generally, to impart sufficient flame retardant performance to a polyester-based fiber product to be dyed, the flame retardant phosphoramidate is preferably used in an amount in a range of 0.5 to 10% owf, more preferably in a range of 0.5 to 8.0% owf, and most preferably in a range of 1.0 to 8.0% owf.

In addition, the bath ratio of the processing bath is not particularly limited, but it is generally in a range of 1:3 to 1:30, and preferably in a range of 1:5 to 1:20. When the bath ratio is lower than 1:3, the polyester-based fiber product is not sufficiently immersed in the processing bath, which may possibly result in dyeing unevenness. On the other hand, when the bath ratio is higher than 1:30, too much water is wastefully used for the simultaneous dyeing and flame-retardant finishing, which is uneconomical.

In the method of the present invention, the “polyester-based fiber product” encompasses at least a fiber including a polyester fiber, as well as a yarn, wadding, and fabric such as a knitted/woven fabric and an unwoven fabric that include such a fiber. Preferably it encompasses a polyester fiber, as well as a yarn, wadding, and fabric such as a knitted/woven fabric and an unwoven fabric that are made of the polyester fiber. In addition, a fabric such as a knitted/woven fabric or an unwoven fabric may have a single layer, may be a laminated body of two or more layers, and may be a composite made of any of a yarn, a wadding, a knitted/woven fabric, an unwoven fabric, and the like.

In the present invention, the polyester fiber is made of, for example, the following: polyethylene terephthalate; polypropylene terephthalate; polybutylene terephthalate; polyethylene naphthalate; polybutylene naphthalate: polyethylene terephthalatelisophthalate; polyethylene terephthalate/5-sulfoisophthalate; polyethylene terephthalate/polyoxybenzoyl; polybutylene terephthalate/isophthalate; polyalphatic hydroxycarboxylic acid such as poly(D-lactic acid); poly(L-lactic acid), a copolymer of D-lactic acid and L-lactic acid, a copolymer of D-lactic acid and aliphatic hydroxycarboxylic acid, a copolymer of L-lactic acid and aliphatic hydroxycarboxylic acid, polycaprolactone such as poly(ε-caprolactone) (PCL), poly(malic acid), poly(hydroxybutyric acid), poly(hydroxyvalericacid), and β-hydroxybutyric acid (3HB)-3-hydroxyvaleric acid (3HV) random copolymer; polyester of glycol and aliphatic dicarboxylic acid such as polyethylene succinate (PES), polybutylene succinate (PBS), polybutylene adipate, and polybutylene succinate-adipate copolymer. The polyester fiber, however, is not limited to these examples.

The dyed and flame-retardant-finished polyester-based fiber product obtained by the method of the present invention is suitably used in, for example, sheets for seats, seat covers, curtains, wallpapers, ceiling cloth, carpets, thick curtains, curing sheets for construction sites, tents, and sailcloth.

In the method of the present invention, as long as the dyeing reproducibility obtained by the method for simultaneously dyeing and flame-retardant finishing a polyester-based fiber product is not inhibited, another disperse dye that has been conventionally known can be used in combination. Examples of such a disperse dye include, though not limited to, red disperse dyes such as C.I.Disperse Red 53, 60, 86, 92, 167:1, blue disperse dyes such as C.I.Disperse Blue 54, 60, 77, 165, and orange disperse dyes such as C.I.Disperse Orange 29, 155.

EXAMPLES

The following description further describes the present invention in detail by referring to examples, as well as comparative examples, but the present invention is not limited to these examples.

(Average Particle Size of Yellow Disperse Dye and Flame Retardant)

The yellow disperse dyes and the flame retardants to be mentioned below were wet-pulverized in the presence of a surfactant with use of a mill filled with glass beads having a diameter of 0.5 mm so as to have predetermined average particle sizes, respectively, and were used as an aqueous dispersion of the same.

In addition, each of average particle sizes of the disperse dyes and the flame retardants refers to a volume-based median diameter that was determined based on a particle size distribution of each dispersion measured with use of a laser diffraction particle size analyzer SALD-2000J manufactured by Shimadzu Corporation.

(Measurement of Color of Dyed Product)

In the following examples, to measure the color of a dyed product obtained, a spectrophotometer CM-600d (manufactured by Konica Minolta Inc.) was used.

In Examples and Comparative Examples described below, first of all, polyester double pique (basis weight of 240 g/$m^2$) was used as a fabric to be treated (subject fabric); a dyed product was obtained by dyeing this fabric at a temperature of 100° C. with a disperse dye in the absence of a flame retardant, another dyed product was obtained by dyeing this fabric at a temperature of 100° C. with the same disperse dye in the presence of a flame retardant, and these dyed products were subjected to color measurement and a color difference ΔE(100° C.) was determined. A dyed product was obtained by dyeing the subject fabric at a temperature of 130° C. with a disperse dye in the absence of a flame retardant, another dyed product was obtained by dyeing the foregoing fabric at a temperature of 130° C. with the same disperse dye in the presence of a flame retardant, and these dyed products were subjected to color measurement and a color difference ΔE(130° C.) was determined.

Next, a color difference ΔE(dye) was determined between the dyed product obtained by dyeing the subject fabric at a temperature of 100° C. with a disperse dye in the absence of a flame retardant, and the dyed product obtained by dyeing the subject fabric at a temperature of 130° C. with a disperse dye in the absence of a flame retardant. A color difference ΔE(dye+flame retardant) was determined between the dyed product obtained by dyeing the subject fabric at a temperature of 100° C. with a disperse dye in the presence of a flame retardant and the dyed product obtained by dyeing the subject fabric at a temperature of 130° C. with a disperse dye in the presence of a flame retardant.

Next, with the color difference ΔE(dye) and the color difference ΔE(dye+flame retardant), the value of the formula of (color difference ΔE(dye)/color difference ΔE(dye+flame retardant))×100 was determined, and this value was assumed to be a rate of change of dyeing rate when the subject fabric was dyed with the disperse dye in the presence of the flame retardant.

In the present invention, as is described below, a case in which all of the values of ΔE(100° C.), ΔE(130° C.), and (ΔE(dye)/ΔE(dye+flame retardant))×100 are in the certain ranges, respectively, is assumed to be a case with excellent dyeing reproducibility.

In the present invention, the hue of a dyed product obtained by simultaneous dyeing and flame-retardant finishing of the subject fabric was evaluated according to the color space of the L*a*b* color system specified in 1974 by the International Commission on Illumination (CIE). In the L*a*b* color system, the L* value is referred to as a lightness index, and a greater value of the same indicates that the color is lighter, while a smaller value of the same indicates that the color is darker. The white color has an L* value of 100, and the black color has an L* value of 0. The a* value and the b* value represent hue and saturation, and are referred to as chromatics indices. The a* value increased in the positive value direction indicates that the color is more reddish, while the a* value increased in the negative value direction indicates that the color is more greenish. The b* value increased in the positive value direction indicates that the color is more yellowish, while the b* value increased in the negative value direction Indicates that the color is more blueish.

In this L*a*b* color system, a difference between two colors, i.e., a color difference ΔE, is represented by a distance between coordinates of the two colors in the color space. In other words, the color difference ΔE can be expressed as follows:

$$\Delta E=\left[(\Delta L^*)^2+(\Delta a^*)^2+(\Delta b^*)^2\right]^{1/2}$$

Example 1

In a processing bath having a bath ratio of 1:10 containing a yellow disperse dye represented by Formula (I) having an average particle size of 0.8 μm in an amount of 0.3% owf, a subject fabric (polyester double pique (having a basis weight of 240 g/m$^2$)) was placed, and was subjected to exhaustion processing in the bath at a temperature raised from 40° C. to 100° C. at a rate of 2° C. per minute. Subsequently, the fabric was soaped and washed with water, then dewatered and dried, whereby a dyed fabric was obtained. The dyed fabric was subjected to color measurement so that L*(100), a*(100), and b*(100) were determined.

Next, the same subject fabric as described above was placed in a processing bath having the same configuration as described above, the temperature was raised from 40° C. to 130° C. at a rate of 2° C. per minute, and the fabric was kept at the temperature for 30 minutes for exhaustion processing in the bath. Subsequently, the fabric was soaped and washed with water, then dewatered and dried, whereby a dyed fabric was obtained. This dyed fabric was subjected to color measurement in the same manner as described above so that L*(130), a*(130), and b*(130) were determined.

Another dyed fabric was prepared by placing the same subject fabric as described above in a processing bath having a bath ratio of 1:10 containing a yellow disperse dye represented by Formula (I) having an average particle size of 0.8 μm in an amount of 0.3% owf, and flame retardant phosphoramidate represented by Formula (V) having an average particle size of 0.6 μm in an amount of 4.0% owf, subjecting the fabric to exhaustion processing in the bath at a temperature raised from 40° C. to 100° C. at a rate of 2° C. per minute, followed by soaping treatment and washing with water, then dewatering and drying.

The dyed fabric was subjected to the same color measurement as described above so that L*(100 flame retardant), a*(100 flame retardant), and b*(100 flame retardant) were determined.

Next, the same subject fabric as described above was placed in a processing bath having the same configuration as described above, the temperature was raised from 40° C. to 130° C. at a rate of 2° C. per minute, and the fabric was kept at the temperature for 30 minutes for exhaustion processing in the bath. Then, the fabric was soaped and washed with water, then dewatered and dried, whereby a dyed fabric was obtained. The dyed fabric was subjected to the same color measurement as described above so that L*(130 flame retardant), a*(130 flame retardant), and b*(130 flame retardant) were determined.

The following values were determined based on the color measurement results thus obtained.

(1) The color difference ΔE(100° C.) between the dyed fabric obtained by dyeing the subject fabric at 100° C. with the disperse dye in the absence of the flame retardant, and the dyed fabric obtained by dyeing the subject fabric at 100° C. with the disperse dye in the presence of the flame retardant, was determined by the following formula:

$$\Delta E(100^\circ\text{ C.})=\left[(L^*(100)-L^*(100\text{ flame retardant}))^2+(a^*(100)-a^*(100\text{ flame retardant}))^2+(b^*(100)-b^*(100\text{ flame retardant}))^2\right]^{1/2}$$

(2) The color difference ΔE(130° C.) between the dyed fabric obtained by dyeing the subject fabric at 130° C. with the disperse dye in the absence of the flame retardant, and the dyed fabric obtained by dyeing the subject fabric at 130° C. with the disperse dye in the presence of the flame retardant, was determined by the following formula:

$$\Delta E(130^\circ\text{ C.})=\left[(L^*(130)-L^*(130\text{ flame retardant}))^2+(a^*(130)-a^*(130\text{ flame retardant}))^2+(b^*(120)-b^*(130\text{ flame retardant}))^2\right]^{1/2}$$

(3) The color difference ΔE(dye) between the dyed fabric obtained by dyeing the subject fabric at 100° C. with the disperse dye in the absence of the flame retardant, and the dyed fabric obtained by dyeing the subject fabric at 130° C. with the disperse dye in the absence of the flame retardant, was determined by the following formula:

$$\Delta E\text{ (dye)}=\left[(L^*(100)-L^*(130))^2+(a^*(100)-a^*(130))^2+(b^*(100)-b^*(130))^2\right]^{1/2}$$

(4) The color difference ΔE(dye+flame retardant) between the dyed fabric obtained by dyeing the subject fabric at 100° C. with the disperse dye in the presence of the flame retardant, and the dyed fabric obtained by dyeing the subject fabric at 130° C. with the disperse dye in the presence of the flame retardant, was determined by the following formula:

$$\Delta E(\text{dye + flame retardant})=\left[(L^*(100\text{ flame retardant})-L^*(130\text{ flame retardant}))^2+(a^*(100\text{ flame retardant})-a^*(130\text{ flame retardant}))^2+(b^*(100\text{ flame retardant})-b^*(130\text{ flame retardant}))^2\right]^{1/2}$$

Next, a value obtained by the following formula was assumed to be a rate of change of dyeing rate of the disperse dye when the flame retardant was added to the processing bath containing the disperse dye:

$$\left(\Delta E(\text{dye})/\Delta E(\text{dye + flame retardant})\right)\times 100$$

The rate of change of dyeing rate may be simply referred to as "dyeing-rate change rate".

(Evaluation)

Evaluation criteria for ΔE(100° C.), ΔE(130° C.), and the dyeing-rate change rate are as follows.

When the value of ΔE(100° C.) was less than 5.00, it was regarded as appropriate (○), and when the value of ΔE(100° C.) was 5.00 or more, it was regarded as inappropriate (x). When the value of ΔE(130° C.) was less than 5.00, it was regarded as appropriate (○), and when the value of ΔE(130° C.) was 5.00 or more, it was regarded as inappropriate (x).

The value of the dyeing-rate change rate exceeds 100 when ΔE(dye) is greater than ΔE(dye+flame retardant). In other words, the dyeing rate is increased by using a disperse dye and a flame retardant in combination. The value of the dyeing-rate change rate is 100 or lower when ΔE(dye) is smaller than ΔE(dye+flame retardant). In other words, it can be considered that the dyeing rate is decreased by using a disperse dye and a flame retardant in combination, and therefore, it can be considered that the flame retardant inhibits the dyeing operation by the dye.

Dyeing unevenness occurs when the dyeing rate is excessively high, and poor color development occurs when the dyeing rate is excessively low. In the present invention, therefore, a dyeing-rate change rate in a range of 100 to 120 was regarded as appropriate (○) and a dyeing-rate change rate of less than 100 and that of 121 or more were regarded as inappropriate (x).

Examples 2 to 4

Dyed fabrics were obtained in the same manner as that in Example 1 except that the yellow disperse dyes represented by Formulae (II) to (IV) above, all of which have an average particle size of 0.8 μm, were used, respectively, in place of the yellow disperse dye represented by Formula (I) above having an average particle size of 0.8 μm.

These dyed fabrics were subjected to color measurement in the same manner as in Example 1, so that, ΔE(100° C.), ΔE(130° C.), and dyeing-rate change rates were determined. The evaluation results of Examples 1 to 4 are shown in Table 1.

Examples 5 to 8

Dyed fabrics were obtained in the same manner as that in Example 1 except that the yellow disperse dyes represented by Formulae (I) to (IV) above, all of which have an average particle size of 0.8 μm, were used, respectively, in an amount of 5.0% owf each in place the yellow disperse dye represented by Formula (I) above having an average particle size of 0.8 μm in an amount of 0.3% owf.

These dyed fabrics were subjected to color measurement in the same manner as in Example 1, so that ΔE(100° C.), ΔE(130° C.), and dyeing-rate change rates were determined. The evaluation results of Examples 5 to 8 are shown in Table 2.

Examples 9 to 12

Dyed fabrics were obtained by using the yellow disperse dyes in an amount of 0.3% owf each, all having an average particle size of 0.8 μm, represented by Formulae (I) to (IV) above, respectively, in the same manner as that in Examples 1 to 4 except that the flame retardant phosphoramidate represented by Formula (V) above having an average particle size of 0.6 μm was used in an amount of 8.0% owf in place of the flame retardant phosphoramidate represented by Formula (V) above having an average particle size of 0.6 μm in an amount of 4.0% owf, used in Examples 1 to 4.

These dyed fabrics were subjected to color measurement in the same manner as in Example 1, so that ΔE(100° C.), ΔE(130° C.), and dyeing-rate change rates were determined. The evaluation results of Examples 9 to 12 are shown in Table 3.

Examples 13 to 16

Dyed fabrics were obtained by using the yellow disperse dyes in an amount of 0.3% owf each, all having an average particle size of 0.8 μm, represented by Formulae (I) to (IV) above, respectively, in the same manner as that in Examples 1 to 4 except that the flame retardant phosphoramidate represented by Formula (V) above having an average particle size of 0.6 μm was used in an amount of 1.0% owf in place of 4.0% owf of the flame retardant phosphoramidate represented by Formula (V) above having an average particle size of 0.6 μm used in Examples 1 to 4.

These dyed fabrics were subjected to color measurement in the same manner as in Example 1, so that ΔE(100° C.), ΔE(130° C.), and dyeing-rate change rates were determined. The evaluation results of Examples 13 to 16 are shown in Table 4.

Comparative Example 1

A dyed fabric was obtained in the same manner as in Example 1 except that resorcinol bis(2,6-dixylenylphosphate) represented by Formula (VI) below having an average particle size of 0.6 μm was used as a flame retardant in place of the phosphoramidate represented by Formula (V) above:

(VI)

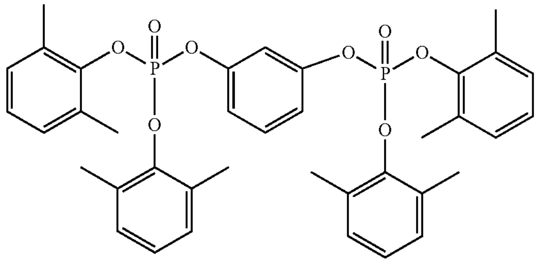

Comparative Example 2

A dyed fabric was obtained in the same manner as in Example 1 except that 10-benzyl-9,10-dihydro-9-oxa-10-phosphaphenanthrene-10-oxide represented by Formula (VII) below having an average particle size of 0.6 μm was used as a flame retardant in place of the phosphoramidate represented by Formula (V) above:

(VII)

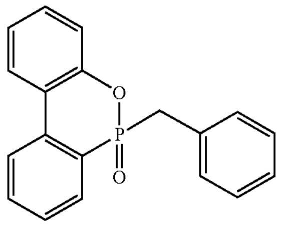

Comparative Example 3

A dyed fabric was obtained in the same manner as in Example 1 except that 2-phenoxyethyl diphenyl phosphate represented by Formula (VIII) below having an average particle size of 0.6 μm was used as a flame retardant in place of the phosphoramidate represented by Formula (V) above:

(VIII)

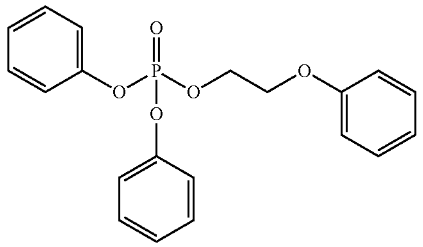

Comparative Example 4

A dyed fabric was obtained in the same manner as in Example 1 except that 5,5-dimethyl-2-(2'-phenyl phenoxy)-1,3,2-dioxaphosphorinane-2-oxide represented by Formula (IX) below having an average particle size of 0.6 μm was used as a flame retardant in place of the phosphoramidate represented by Formula (V) above:

(IX)

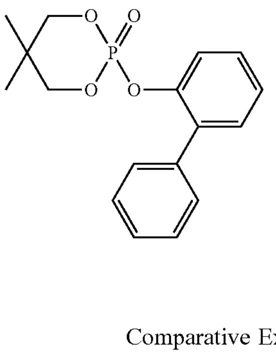

Comparative Example 5

A dyed fabric was obtained in the same manner as in Example 1 except that tris p-cresyl phosphate represented by Formula (X) below having an average particle size of 0.6 μm was used as a flame retardant in place of the phosphoramidate represented by Formula (V) above:

(X)

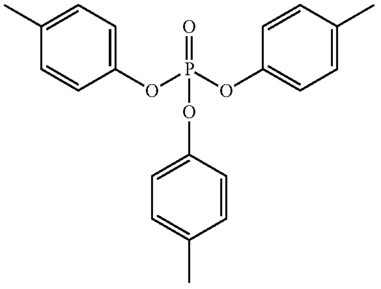

Comparative Example 6

A dyed fabric was obtained in the same manner as in Example 1 except that tris(2,3-dibromopropyl) isocyanurate represented by Formula (XI) below having an average particle size of 0.6 μm was used as a flame retardant in place of the phosphoramidate represented by Formula (V) above:

(XI)

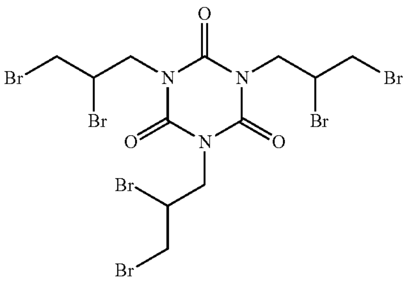

These dyed fabrics obtained in Comparative Examples 1 to 6 were subjected to color measurement in the same manner as in Example 1, so that ΔE(100° C.), ΔE(130° C.), and dyeing-rate change rates were determined. The evaluation results of Comparative Examples 1 to 6 are shown in Table 5.

Comparative Examples 7 to 12

Dyed fabrics were obtained in the same manner as that in Comparative Examples 1 to 6 except that the yellow disperse dyes represented by Formula (II) above was used in place of the yellow disperse dye represented by Formula (I) above.

These dyed fabrics were subjected to color measurement in the same manner as in Example 1, so that ΔE(100° C.), ΔE(130° C.), and dyeing-rate change rates were determined. The evaluation results of Comparative Examples 7 to 12 are shown in Table 6.

Comparative Examples 13 to 18

Dyed fabrics were obtained in the same manner as that in Comparative Examples 1 to 6 except that the yellow disperse dyes represented by Formula (III) above was used in place of the yellow disperse dye represented by Formula (I) above.

These dyed fabrics were subjected to color measurement in the same manner as in Example 1, so that ΔE(100° C.), ΔE(130° C.), and dyeing-rate change rates were determined. The evaluation results of Comparative Examples 13 to 18 are shown in Table 7.

Comparative Examples 19 to 24

Dyed fabrics were obtained in the same manner as that in Comparative Examples 1 to 6 except that the yellow disperse dyes represented by Formula (IV) above was used in place of the yellow disperse dye represented by Formula (I) above.

These dyed fabrics were subjected to color measurement in the same manner as in Example 1, so that ΔE(100° C.), ΔE(130° C.), and dyeing-rate change rates were determined. The evaluation results of Comparative Examples 19 to 24 are shown in Table 8.

Comparative Example 25

A dyed fabric was obtained in the same manner as in Example 1 except that the yellow disperse dye represented by Formula (II) having an average particle size of 0.8 μm was used in an amount of 5.0% owf in place of the yellow disperse dye represented by Formula (I) and 5,5-dimethyl-2-(2'-phenyl phenoxy)-1,3,2-dioxaphosphorinane-2-oxide represented by Formula (XI) above having an average particle size of 0.6 μm was used in place of the flame retardant represented by Formula (V) above.

Comparative Example 26

A dyed fabric was obtained in the same manner as in Example 1 except that the yellow disperse dye represented by Formula (II) above having an average particle size of 0.8 μm was used in an amount of 5.0% owf in place of the yellow disperse dye represented by Formula (I) and 2-phenoxyethyl diphenyl phosphate represented by Formula (VIII) above having an average particle size of 0.6 μm was used in place of the flame retardant represented by Formula (V) above.

Comparative Example 27

A dyed fabric was obtained in the same manner as in Example 1 except that the yellow disperse dye represented by Formula (IV) above having an average particle size of 0.8 μm was used in an amount of 5.0% owf in place of the yellow disperse dye represented by Formula (I) and 2-phenoxyethyl diphenyl phosphate represented by Formula (VIII) above having an average particle size of 0.6 μm was used in place of the flame retardant represented by Formula (V) above.

Comparative Example 28

A dyed fabric was obtained in the same manner as that in Example 1 except that the yellow disperse dye represented by Formula (Xii) having an average particle size of 0.8 μm was used in place of the yellow disperse dye represented by Formula (I).

(XII)

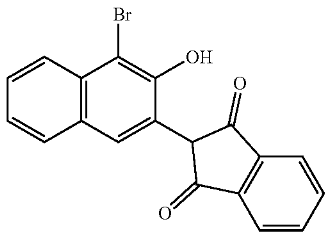

The yellow disperse dye represented by Formula (XII) above is C.I.Disperse Yellow 64, which is not the yellow disperse dye specified for use in the present invention.

These dyed fabrics obtained in Comparative Examples 25 to 28 were subjected to color measurement in the same manner as in Example 1, so that ΔE(100° C.), ΔE(130° C.), and dyeing-rate change rates were determined. The evaluation results of Comparative Examples 25 to 28 are shown in Table 9.

TABLE 1

| Ex. | Disperse dye | Flame retardant | 100° C. L* | a* | b* | 130° C. L* | a* | b* | ΔE | Dyeing-rate change rate |
|---|---|---|---|---|---|---|---|---|---|---|
| 1 | I | Absent | 90.29 | −5.90 | 33.03 | 96.53 | −12.15 | 68.77 | 36.82 | 107.3 |
| | | V | 93.10 | −6.52 | 37.11 | 96.44 | −11.72 | 70.85 | 34.30 | |
| | | ΔE | ΔE(100° C.) = 4.99 | | | ΔE(130° C.) = 2.13 | | | | |
| 2 | II | Absent | 92.80 | −3.52 | 13.86 | 88.17 | −3.76 | 57.02 | 43.41 | 118.2 |
| | | V | 92.45 | −4.16 | 17.50 | 89.01 | −4.70 | 54.07 | 36.74 | |
| | | ΔE | ΔE(100° C.) = 3.71 | | | ΔE(130° C.) = 3.21 | | | | |
| 3 | III | Absent | 88.16 | 2.79 | 28.88 | 84.79 | 6.36 | 61.21 | 32.70 | 111.3 |
| | | V | 88.38 | 2.88 | 27.45 | 84.12 | 6.04 | 56.35 | 29.38 | |
| | | ΔE | ΔE(100° C.) = 1.45 | | | ΔE(130° C.) = 4.92 | | | | |
| 4 | IV | Absent | 92.01 | −7.72 | 29.58 | 89.76 | −8.70 | 55.20 | 25.74 | 104.9 |
| | | V | 92.06 | −7.77 | 29.73 | 90.19 | −8.80 | 54.17 | 24.53 | |
| | | ΔE | ΔE(100° C.) = 0.17 | | | ΔE(130° C.) = 1.12 | | | | |

(Note) The disperse dye had an average particle diameter of 0.8 μm, the used amount of the same was 0.3% owf, the flame retardant had an average particle diameter of 0.6 μm, and the used amount of the same was 4.0% owf.

TABLE 2

| Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 5 | I | Absent | 91.91 | −4.55 | 44.29 | 90.04 | 5.94 | 113.38 | 69.91 | 101.7 |
| | | V | 93.70 | −7.57 | 46.61 | 90.78 | 4.71 | 114.17 | 68.73 | |
| | | ΔE | ΔE(100° C.) = 4.21 | | | ΔE(130° C.) = 1.64 | | | | |
| 6 | II | Absent | 90.99 | −5.69 | 35.22 | 77.95 | 19.26 | 95.89 | 66.88 | 102.7 |
| | | V | 90.37 | −5.92 | 33.40 | 79.94 | 18.23 | 92.95 | 65.10 | |
| | | ΔE | ΔE(100° C.) = 1.94 | | | ΔE(130° C.) = 3.70 | | | | |
| 7 | III | Absent | 86.07 | 4.91 | 26.33 | 74.07 | 24.00 | 82.04 | 60.10 | 101.4 |
| | | V | 88.27 | 4.62 | 26.52 | 74.38 | 25.51 | 80.19 | 59.24 | |
| | | ΔE | ΔE(100° C.) = 2.23 | | | ΔE(130° C.) = 2.41 | | | | |
| 8 | IV | Absent | 89.60 | −7.54 | 51.66 | 84.22 | 1.92 | 92.36 | 42.13 | 102.8 |
| | | V | 89.36 | −7.63 | 55.01 | 83.39 | 3.38 | 94.05 | 41.00 | |
| | | ΔE | ΔE(100° C.) = 3.36 | | | ΔE(130° C.) = 2.38 | | | | |

(Note)
The disperse dye had an average particle diameter of 0.8 μm, the used amount of the same was 5.0% owf, the flame retardant had an average particle diameter of 0.6 μm, and the used amount of the same was 4.0% owf.

TABLE 3

| Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 9 | I | Absent | 90.29 | −5.90 | 33.03 | 96.53 | −12.15 | 68.77 | 36.82 | 107.5 |
| | | V | 94.07 | −7.39 | 35.03 | 95.57 | −11.48 | 69.01 | 34.26 | |
| | | ΔE | ΔE(100° C.) = 4.53 | | | ΔE(130° C.) = 1.20 | | | | |
| 10 | II | Absent | 92.80 | −3.52 | 13.86 | 88.17 | −3.76 | 57.02 | 43.41 | 102.1 |
| | | V | 91.45 | −5.74 | 12.32 | 88.94 | −5.50 | 54.74 | 42.49 | |
| | | ΔE | ΔE(100° C.) = 3.02 | | | ΔE(130° C.) = 2.97 | | | | |
| 11 | III | Absent | 88.16 | 2.79 | 28.88 | 84.79 | 6.36 | 61.21 | 32.70 | 102.3 |
| | | V | 89.24 | 1.41 | 24.95 | 86.15 | 5.91 | 56.45 | 31.97 | |
| | | ΔE | ΔE(100° C.) = 4.30 | | | ΔE(130° C.) = 4.97 | | | | |
| 12 | IV | Absent | 92.01 | −7.72 | 29.58 | 89.76 | −8.70 | 55.20 | 25.74 | 102.1 |
| | | V | 91.26 | −7.93 | 29.55 | 89.62 | −8.42 | 54.70 | 25.21 | |
| | | ΔE | ΔE(100° C.) = 0.78 | | | ΔE(130° C.) = 0.59 | | | | |

(Note)
The disperse dye had an average particle diameter of 0.8 μm, the used amount of the same was 0.3% owf, the flame retardant had an average particle diameter of 0.6 μm, and the used amount of the same was 8.0% owf.

TABLE 4

| Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 13 | I | Absent | 90.29 | −5.90 | 33.03 | 96.53 | −12.15 | 68.77 | 36.82 | 106.9 |
| | | V | 93.67 | −6.04 | 36.32 | 96.27 | −12.46 | 70.04 | 34.42 | |
| | | ΔE | ΔE(100° C.) = 4.72 | | | ΔE(130° C.) = 1.33 | | | | |
| 14 | II | Absent | 92.80 | −3.52 | 13.86 | 88.17 | −3.76 | 57.02 | 43.41 | 116.4 |
| | | V | 92.65 | −4.98 | 17.91 | 88.53 | −4.55 | 54.98 | 37.30 | |
| | | ΔE | ΔE(100° C.) = 4.31 | | | ΔE(130° C.) = 2.22 | | | | |
| 15 | III | Absent | 88.16 | 2.79 | 28.88 | 84.79 | 6.36 | 61.21 | 32.70 | 103.0 |
| | | V | 91.18 | −0.63 | 29.21 | 84.39 | 6.79 | 59.33 | 31.75 | |
| | | ΔE | ΔE(100° C.) = 4.57 | | | ΔE(130° C.) = 1.97 | | | | |
| 16 | IV | Absent | 92.01 | −7.72 | 29.58 | 89.76 | −8.70 | 55.20 | 25.74 | 115.9 |
| | | V | 91.71 | −8.31 | 31.96 | 90.12 | −9.15 | 54.09 | 22.20 | |
| | | ΔE | ΔE(100° C.) = 2.47 | | | ΔE(130° C.) = 1.25 | | | | |

(Note)
The disperse dye had an average particle diameter of 0.8 μm, the used amount of the same was 0.3% owf, the flame retardant had an average particle diameter of 0.6 μm, and the used amount of the same was 1.0% owf.

TABLE 5

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 1 | I | Absent | 90.29 | −5.90 | 33.03 | 96.53 | −12.15 | 68.77 | 36.82 | 96.8 |
| | | VI | 95.76 | −10.02 | 30.99 | 95.56 | −12.41 | 68.94 | 38.03 | |
| | | ΔE | ΔE(100° C.) = 7.15 | | | ΔE(130° C.) = 0.31 | | | | |

TABLE 5-continued

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 2 | I | Absent | 90.29 | −5.90 | 33.03 | 96.53 | −12.15 | 68.77 | 36.82 | 108.1 |
| | | VII | 94.44 | −4.57 | 35.78 | 94.80 | −8.72 | 69.57 | 34.05 | |
| | | ΔE | ΔE(100° C.) = 5.15 | | | ΔE(130° C.) = 3.92 | | | | |
| 3 | I | Absent | 90.29 | −5.90 | 33.03 | 96.53 | −12.15 | 68.77 | 36.82 | 102.0 |
| | | VIII | 95.67 | −6.02 | 36.19 | 95.75 | −11.75 | 71.81 | 36.08 | |
| | | ΔE | ΔE(100° C.) = 6.24 | | | ΔE(130° C.) = 3.16 | | | | |
| 4 | I | Absent | 90.29 | −5.90 | 33.03 | 96.53 | −12.15 | 68.77 | 36.82 | 118.1 |
| | | IX | 95.81 | −11.95 | 37.88 | 95.46 | −12.03 | 69.06 | 31.18 | |
| | | ΔE | ΔE(100° C.) = 9.52 | | | ΔE(130° C.) = 1.17 | | | | |
| 5 | I | Absent | 90.29 | −5.90 | 33.03 | 96.53 | −12.15 | 68.77 | 36.82 | 111.8 |
| | | X | 95.34 | −12.31 | 35.36 | 95.49 | −12.00 | 68.30 | 32.94 | |
| | | ΔE | ΔE(100° C.) = 8.49 | | | ΔE(130° C.) = 1.15 | | | | |
| 6 | I | Absent | 90.29 | −5.90 | 33.03 | 96.53 | −12.15 | 68.77 | 36.82 | 104.9 |
| | | XI | 92.09 | −4.01 | 24.88 | 85.27 | 5.51 | 57.96 | 35.09 | |
| | | ΔE | ΔE(100° C.) = 8.56 | | | ΔE(130° C.) = 23.57 | | | | |

(Note)
The disperse dye had an average particle diameter of 0.8 μm. the used amount of the same was 0.3% owf, the flame retardant had an average particle diameter of 0.6 μm, and the used amount of the same was 4.0% owf.

TABLE 6

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 7 | II | Absent | 92.80 | −3.52 | 13.86 | 88.17 | −3.76 | 57.02 | 43.41 | 109.6 |
| | | VI | 93.09 | −3.00 | 10.46 | 89.74 | −5.37 | 49.87 | 39.62 | |
| | | ΔE | ΔE(100° C.) = 3.45 | | | ΔE(130° C.) = 7.50 | | | | |
| 8 | II | Absent | 92.80 | −3.52 | 13.86 | 88.17 | −3.76 | 57.02 | 43.41 | 98.0 |
| | | VII | 92.92 | −3.41 | 11.13 | 89.01 | −4.34 | 55.25 | 44.30 | |
| | | ΔE | ΔE(100° C.) = 2.73 | | | ΔE(130° C.) = 2.04 | | | | |
| 9 | II | Absent | 92.80 | −3.52 | 13.86 | 88.17 | −3.76 | 57.02 | 43.41 | 161.3 |
| | | VIII | 91.90 | −5.78 | 25.24 | 89.47 | −5.28 | 52.03 | 26.90 | |
| | | ΔE | ΔE(100° C.) = 11.64 | | | ΔE( 130° C.) = 5.38 | | | | |
| 10 | II | Absent | 92.80 | −3.52 | 13.86 | 88.17 | −3.76 | 57.02 | 43.41 | 116.8 |
| | | IX | 92.61 | −4.92 | 15.29 | 89.79 | −4.77 | 52.35 | 37.17 | |
| | | ΔE | ΔE(100° C.) = 2.01 | | | ΔE(130° C.) = 5.05 | | | | |
| 11 | II | Absent | 92.80 | −3.52 | 13.86 | 88.17 | −3.76 | 57.02 | 43.41 | 167.6 |
| | | X | 92.10 | −5.95 | 24.38 | 89.51 | −5.59 | 50.15 | 25.90 | |
| | | ΔE | ΔE(100° C.) = 10.82 | | | ΔE(130° C.) = 7.23 | | | | |
| 12 | II | Absent | 92.80 | −3.52 | 13.86 | 88.17 | −3.76 | 57.02 | 43.41 | 105.6 |
| | | XI | 92.64 | −4.29 | 15.57 | 88.72 | −4.28 | 56.48 | 41.10 | |
| | | ΔE | ΔE(100° C.) = 1.88 | | | ΔE(130° C.) = 0.93 | | | | |

(Note)
The disperse dye had an average particle diameter of 0.8 μm, the used amount of the same was 0.3% owf, the flame retardant had an average particle diameter of 0.6 μm, and the used amount of the same was 4.0% owf.

TABLE 7

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 13 | III | Absent | 88.16 | 2.79 | 28.88 | 84.79 | 6.36 | 61.21 | 32.70 | 82.8 |
| | | VI | 91.55 | −0.71 | 10.71 | 86.09 | 3.01 | 49.65 | 39.50 | |
| | | ΔE | ΔE(100° C.) = 18.81 | | | ΔE(130° C.) = 12.11 | | | | |
| 14 | III | Absent | 88.16 | 2.79 | 28.88 | 84.79 | 6.36 | 61.21 | 32.70 | 95.9 |
| | | VII | 89.15 | 0.74 | 29.43 | 84.25 | 7.85 | 62.42 | 34.10 | |
| | | ΔE | ΔE(100° C.) = 2.34 | | | ΔE(130° C.) = 1.99 | | | | |
| 15 | III | Absent | 88.16 | 2.79 | 28.88 | 84.79 | 6.36 | 61.21 | 32.70 | 115.3 |
| | | VIII | 88.38 | 1.52 | 32.36 | 84.56 | 6.71 | 59.98 | 28.36 | |
| | | ΔE | ΔE(100° C.) = 3.71 | | | ΔE(130° C.) = 1.30 | | | | |
| 16 | III | Absent | 88.16 | 2.79 | 28.88 | 84.79 | 6.36 | 61.21 | 32.70 | 132.3 |
| | | IX | 88.17 | 1.36 | 33.50 | 83.12 | 9.74 | 56.19 | 24.71 | |
| | | ΔE | ΔE(100° C.) = 4.84 | | | ΔE(130° C.) = 6.28 | | | | |
| 17 | III | Absent | 88.16 | 2.79 | 28.88 | 84.79 | 6.36 | 61.21 | 32.70 | 177.2 |
| | | X | 87.02 | 3.82 | 37.09 | 84.47 | 7.20 | 55.05 | 18.45 | |
| | | ΔE | ΔE(100° C.) = 8.35 | | | ΔE(130° C.) = 6.23 | | | | |

TABLE 7-continued

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 18 | III | Absent | 88.16 | 2.79 | 28.88 | 84.79 | 6.36 | 61.21 | 32.70 | 93.2 |
| | | XI | 92.09 | −4.01 | 24.88 | 85.27 | 5.51 | 57.96 | 35.09 | |
| | | ΔE | ΔE(100° C.) = 8.81 | | | ΔE(130° C.) = 3.39 | | | | |

(Note)
The disperse dye had an average particle diameter of 0.8 μm, the used amount of the same was 0.3% owf, the flame retardant had an average particle diameter of 0.6 μm. and the used amount of the same was 4.0% owf.

TABLE 8

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 19 | IV | Absent | 92.01 | −7.72 | 29.58 | 89.76 | −8.70 | 55.20 | 25.74 | 77.4 |
| | | VI | 92.52 | −5.36 | 19.16 | 90.47 | −8.98 | 52.15 | 33.25 | |
| | | ΔE | ΔE(100° C.) = 10.70 | | | ΔE(130° C.) = 3.14 | | | | |
| 20 | IV | Absent | 92.01 | −7.72 | 29.58 | 89.76 | −8.70 | 55.20 | 25.74 | 91.1 |
| | | VII | 82.08 | −7.36 | 27.94 | 92.08 | −8.86 | 54.31 | 28.24 | |
| | | ΔE | ΔE(100° C.) = 10.07 | | | ΔE(130° C.) = 2.49 | | | | |
| 21 | IV | Absent | 92.01 | −7.72 | 29.58 | 89.76 | −8.70 | 55.20 | 25.74 | 101.8 |
| | | VIII | 92.03 | −7.21 | 28.83 | 90.23 | −8.79 | 54.00 | 25.28 | |
| | | ΔE | ΔE(100° C.) = 0.91 | | | ΔE(130° C.) = 1.29 | | | | |
| 22 | IV | Absent | 92.01 | −7.72 | 29.58 | 89.76 | −8.70 | 55.20 | 25.74 | 98.2 |
| | | IX | 92.11 | −7.59 | 28.42 | 90.21 | −9.02 | 54.53 | 26.22 | |
| | | ΔE | ΔE(100° C.) = 1.17 | | | ΔE(130° C.) = 0.87 | | | | |
| 23 | IV | Absent | 92.01 | −7.72 | 29.58 | 89.76 | −8.70 | 55.20 | 25.74 | 98.3 |
| | | X | 92.15 | −7.28 | 27.77 | 90.27 | −9.24 | 53.82 | 26.19 | |
| | | ΔE | ΔE(100° C.) = 1.87 | | | ΔE(130° C.) = 1.57 | | | | |
| 24 | IV | Absent | 92.01 | −7.72 | 29.58 | 89.76 | −8.70 | 55.20 | 25.74 | 89.7 |
| | | XI | 92.34 | −7.29 | 26.76 | 89.86 | −8.81 | 55.32 | 28.71 | |
| | | ΔE | ΔE(100° C.) = 2.87 | | | ΔE(130° C.) = 0.19 | | | | |

(Note)
The disperse dye had an average particle diameter of 0.8 μm, the used amount of the same was 0.3% owf, the flame retardant had an average particle diameter of 0.6 μm. and the used amount of the same was 4.0% owf.

TABLE 9

| Comp. Ex. | Disperse dye | Flame retardant | 100° C. L* | 100° C. a* | 100° C. b* | 130° C. L* | 130° C. a* | 130° C. b* | ΔE | Dyeing-rate change rate |
|---|---|---|---|---|---|---|---|---|---|---|
| 25 | II | Absent | 90.99 | −5.69 | 35.22 | 77.95 | 19.26 | 95.89 | 66.88 | 155.5 |
| | | XI | 76.66 | 16.01 | 44.39 | 76.62 | 18.11 | 87.36 | 43.02 | |
| | | ΔE | ΔE(100° C.) = 27.57 | | | ΔE(130° C.) = 8.71 | | | | |
| 26 | III | Absent | 86.07 | 4.91 | 26.33 | 74.07 | 24.00 | 82.04 | 60.10 | 129.8 |
| | | VIII | 86.60 | 2.67 | 48.92 | 74.07 | 24.96 | 87.54 | 46.32 | |
| | | ΔE | ΔE(100° C.) = 22.71 | | | ΔE(130° C.) = 5.58 | | | | |
| 27 | IV | Absent | 89.60 | −7.54 | 51.66 | 84.22 | 1.92 | 92.36 | 42.13 | 90.6 |
| | | VIII | 88.69 | −5.92 | 46.88 | 83.39 | 2.85 | 92.23 | 46.49 | |
| | | ΔE | ΔE(100° C.) = 5.13 | | | ΔE(130° C.) = 1.25 | | | | |
| 28 | XII | Absent | 82.67 | 13.75 | 22.45 | 87.52 | −5.12 | 81.19 | 61.89 | 159.7 |
| | | V | 89.15 | −5.65 | 42.57 | 87.18 | −4.50 | 81.25 | 38.75 | |
| | | ΔE | ΔE(100° C.) = 28.69 | | | ΔE(130° C.) = 0.71 | | | | |

(Note)
In Comparative Examples 25 to 27, the disperse dye had an average particle diameter of 0.8 μm, the used amount of the same was 5.0% owf, the flame retardant had an average particle diameter of 0.6 μm, and the used amount of the same was 4.0% owf. In Comparative Example 28, the disperse dye had an average particle diameter of 0.8 μm, the used amount of the same was 0.3% owf, the flame retardant had an average particle diameter of 0.6 μm, and the used amount of the same was 4.0% owf.

Table 1 shows that, whichever of the disperse dyes represented by Formulae (I) to (IV) above was used in an amount of 0.3% owf in the presence of 4.0% owf of the flame retardant represented by Formula (V) above, when subject fabrics made of a polyester-based fiber were dyed, both of the color differences ΔE(100° C.) and ΔE(130° C.) were small and appropriate, as well as the dyeing-rate change rate was also appropriate.

More specifically, in both of the case where the dyeing was performed at 100° C. and the case where the dyeing was performed at 130° C., the color difference between the dyed fabrics obtained by dyeing the subject fabrics with the disperse dyes represented by Formulae (I) to (IV) in the absence of the flame retardant represented by Formula (V), and the dyed fabrics obtained by dyeing the subject fabrics with the aforementioned disperse dyes in the presence of the aforementioned flame retardant, was small, and in addition, the dyeing-rate change rate described above was appropriate. From this, it can be concluded that even when the flame retardant is used in combination with the disperse dye, the dyeing-rate change rate is smaller, as compared with a case where the dyeing is performed with use of the disperse dye in the absence of the flame retardant.

Table 2 shows that, in both of the case where the dyeing was performed at 100° C. and the case where the dyeing was performed at 130° C., whichever of the disperse dyes represented by Formulae (I) to (IV) above was used in an amount of 5.0% owf in the presence of 4.0% owf of the flame retardant represented by Formula (V) above, both of the color differences ΔE(100° C.) and ΔE(130° C.) of the obtained dyed product were small and appropriate, as well as the dyeing-rate change rate were also appropriate.

Table 3 shows that, in both of the case where the dyeing was performed at 100° C. and the case where the dyeing was performed at 130° C., whichever of the disperse dyes represented by Formulae (I) to (IV) above was used in an amount of 0.3% owf in the presence of 8.0% owf of the flame retardant represented by Formula (V) above, both of the color differences ΔE(100° C.) and ΔE(130° C.) of the obtained dyed product were small and appropriate, as well as the dyeing-rate change rate were also appropriate.

Table 4 shows that, in both of the case where the dyeing was performed at 100° C. and the case where the dyeing was performed at 130° C., whichever of the disperse dyes represented by Formulae (I) to (IV) above was used in an amount of 0.3% owf in the presence of 1.0% owf of the flame retardant represented by Formula (V) above, both of the color differences ΔE(100° C.) and ΔE(130° C.) of the obtained dyed product were small and appropriate, as well as the dyeing-rate change rate was also appropriate.

As described above, with a method of simultaneous dyeing and flame-retardant finishing in which a polyester-based fiber product is immersed and heated in a processing bath containing at least one selected from the yellow disperse dyes represented by Formulae (I) to (IV) and the flame retardant phosphoramidate represented by Formula (V) according to the present invention, even when subject fabrics are subjected to simultaneous dyeing and flame-retardant finishing at temperatures of 100° C. and 130° C., with the used amounts of the yellow disperse dye and the flame retardant being varied, small and appropriate color differences ΔE(100° C.) and ΔE(130° C.) as well as an appropriate dyeing-rate change rate are achieved, as compared with a case where a polyester-based fiber product is dyed with a yellow disperse dye in the absence of a flame retardant. In this way, with the present invention, it is possible to perform simultaneous dyeing and flame-retardant finishing of a polyester-based fiber product with excellent dyeing reproducibility.

Table 5, in contrast, shows results of experiments in which polyester-based fiber products were dyed using the yellow disperse dye represented by Formula (I) in the presence of conventionally known typical flame retardants represented by Formulae (VI) to (XI), respectively, in place of the flame retardant represented by Formula (V). Whichever of these flame retardants was used, the color difference ΔE(100° C.) was inappropriate, and in cases of some of these flame retardants, the ΔE(130° C.) was inappropriate as well as the dyeing-rate change rate was also inappropriate. Thus, in these cases of simultaneous dyeing and flame-retardant finishing of a polyester-based fiber product, dyeing reproducibility was poor.

Similarly. Table 6 shows results of experiments in Comparative Examples 7 to 12 in which polyester-based fiber products were dyed using the yellow disperse dye represented by Formula (II) in the presence of conventionally known typical flame retardants represented by Formulae (VI) to (XI), respectively, in place of the flame retardant represented by Formula (V).

In Comparative Examples 7 to 11, at least one of the color differences ΔE(100° C.) and ΔE(130° C.) as well as the dyeing-rate change rate was inappropriate, but in Comparative Example 12, all of the color differences ΔE(100° C.) and ΔE(130° C.) as well as the dyeing-rate change rate were appropriate. Other results of Comparative Example 12 are shown below.

Table 7 shows results of experiments in Comparative Examples 13 to 18 in which polyester-based fiber products were dyed using the yellow disperse dye represented by Formula (II) in the presence of conventionally known typical flame retardants represented by Formulae (VI) to (XI), respectively, in place of the flame retardant represented by Formula (V).

In Comparative Examples 13, 14, and 16 to 18, at least one of the color differences ΔE(100° C.) and ΔE(130° C.) as well as the dyeing-rate change rate was inappropriate, but in Comparative Example 15, all of the color differences ΔE(100° C.) and ΔE(130° C.) as well as the dyeing-rate change rate were appropriate. Regarding Comparative Example 15, other results are shown below.

Table 8 shows results of experiments in Comparative Examples 19 to 24 in which polyester-based fiber products were dyed using the yellow disperse dye represented by Formula (IV) in the presence of conventionally known typical flame retardants represented by Formulae (VI) to (XI), respectively, in place of the flame retardant represented by Formula (V).

In Comparative Examples 19, 20, and 22 to 24, at least one of the color differences ΔE(100° C.) and ΔE(130° C.) as well as the dyeing-rate change rate was inappropriate, but in Comparative Example 21, all of the color differences ΔE(100° C.) and ΔE(130° C.) as well as the dyeing-rate change rate were appropriate. Regarding Comparative Example 21, other results are shown below.

Table 9 shows results of Comparative Examples 25 to 28. Among these, the results of Comparative Examples 25 to 27 are results of experiments in which polyester-based fiber products were subjected to simultaneous dyeing and flame-retardant finishing by using the yellow disperse dyes represented by Formulae (11) to (IV), respectively, in an amount of 5.0% owf each, and the flame retardants represented by Formulae (XI), (VIII), and (VIII), respectively, in place of the flame retardant represented by Formula (V).

The combinations of the yellow disperse dye and the flame retardant in Comparative Examples 25 to 27 correspond to those of Comparative Examples 12, 15, and 21, but in Comparative Examples 25 to 27 the used amount of the yellow disperse dyes was 5.0% owf as compared with 0.3% owf in Comparative Examples 12, 15, and 21, resulting in that at least one of the color differences ΔE(100° C.) and ΔE(130° C.) as well as the dyeing-rate change rate was inappropriate.

More specifically, in the case of the flame retardants represented by Formulae (XI) and (VIII), all of the color differences ΔE(100° C.) and ΔE(130° C.) as well as the dyeing-rate change rate were appropriate when the yellow disperse dye used in combination with the flame retardants were small in amount (0.3% owf) as in Comparative Examples 12, 15, and 21, but the dyeing-rate change rate was high when the yellow disperse dye used in combination was large in amount (5.0% owf). Thus, the flame retardants represented by Formulae (XI) and (VIII) inhibit the dyeing reproducibility of the disperse dyes in the simultaneous dyeing and flame-retardant finishing of a polyester-based fiber product using any of the disperse dyes represented by Formulae (I) to (IV).

The results of Comparative Example 28 are results of experiments in which a polyester-based fiber product was subjected to the simultaneous dyeing and flame-retardant finishing in the same manner as in Example 1 except that the yellow disperse dye represented by Formula (XII) above was used in place of the yellow disperse dye represented by Formula (I) used in Example 1, and the color difference ΔE(100° C.) and the dyeing-rate change rate thereof were excessively high, which are inappropriate.

The invention claimed is:

1. A method for simultaneously dyeing and flame-retardant finishing a polyester-based fiber product, the method comprising immersing and heating a polyester-based fiber product in a processing bath containing (A) at least one yellow disperse dye selected from yellow disperse dyes represented by Formulae (I) to (IV) below and (B) a phosphoramidate represented by Formula (V) below:

(A)(1) a yellow disperse dye represented by Formula (I) below:

(I)

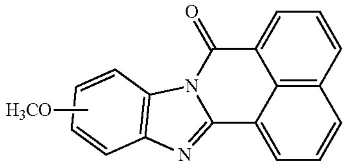

(2) a yellow disperse dye represented by Formula (II) below:

(II)

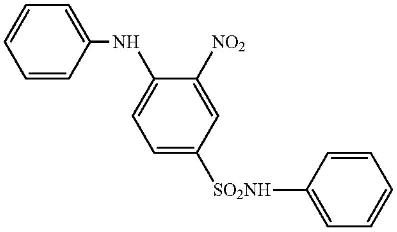

(3) a yellow disperse dye represented by Formula (III) below:

(III)

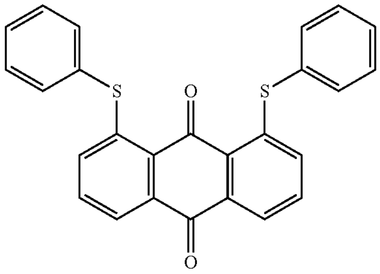

(4) a yellow disperse dye represented by Formula (IV) below:

(IV)

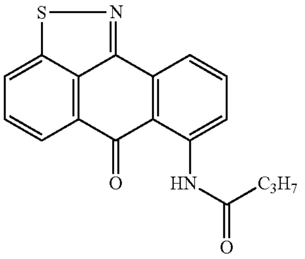

(B) a phosphoramidate represented by Formula (V) below:

(V)

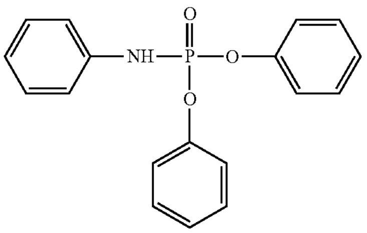

wherein the processing bath is characterized by the following properties:

a color difference ΔE(100° C.) between a dyed fabric obtained by dyeing a subject fabric at 100° C. with the yellow disperse dye in the absence of the phosphoramidate represented by Formula (V), and a dyed fabric obtained by dyeing a subject fabric at 100° C. with the yellow disperse dye in the presence of the phosphoramidate represented by Formula (V) is less than 5, a color difference ΔE(130° C.) between a dyed fabric obtained by dyeing a subject fabric at 130° C. with the yellow disperse dye in the absence of the phosphoramidate represented by Formula (V), and a dyed fabric obtained by dyeing a subject fabric at 130° C. with the yellow disperse dye in the presence of the phosphoramidate represented by Formula (V) is less than 5, and a dyeing-rate change rate obtained by the following formula is in a range of 100 to 120:

$$(\Delta E(\text{dye})/\Delta E(\text{dye+flame retardant}))\times 100,$$

wherein ΔE(dye) is a color difference between the dyed fabric obtained by dyeing the subject fabric at 100° C. with the yellow disperse dye in the absence of the phosphoramidate represented by Formula (V), and the dyed fabric obtained by dyeing the subject fabric at 130° C. with the yellow disperse dye in the absence of the phosphoramidate represented by Formula (V); and ΔE(dye+flame retardant) is a color difference between the dyed fabric obtained by dyeing the subject fabric at 100° C. with the yellow disperse dye in the presence of the phosphoramidate represented by Formula (V), and the dyed fabric obtained by dyeing the subject fabric at 130° C. with the yellow disperse dye in the presence of the phosphoramidate represented by Formula (V), wherein the processing bath contains at least one of the yellow disperse dyes represented by Formulae (I) to (IV) at a concentration in a range of 0.05 to 10% owf, and contains the phosphoramidate at a concentration in a range of 0.5 to 10% owf, wherein all of the at least one of the yellow disperse dyes represented by Formulae (I) to (IV) and the phosphoramidate have an average particle size in a range of 0.2 to 2.0 μm, wherein the polyester-based fiber product includes a polyester fiber that is made of one selected from the group consisting of polyethylene terephthalate; poly (ethylene terephthalate-co-5-sulfoisophthalate); poly (ethylene terephthalate-co-oxybenzoyl); and poly (butylene terephthalate-co-isophthalate).

2. The method for simultaneously dyeing and flame-retardant finishing a polyester-based fiber product according to claim 1, wherein the polyester-based fiber product is immersed in the processing bath, and is heated at 105° C. or higher.

* * * * *